A. K. SIMMONS.
WHEEL.
APPLICATION FILED MAY 17, 1920.

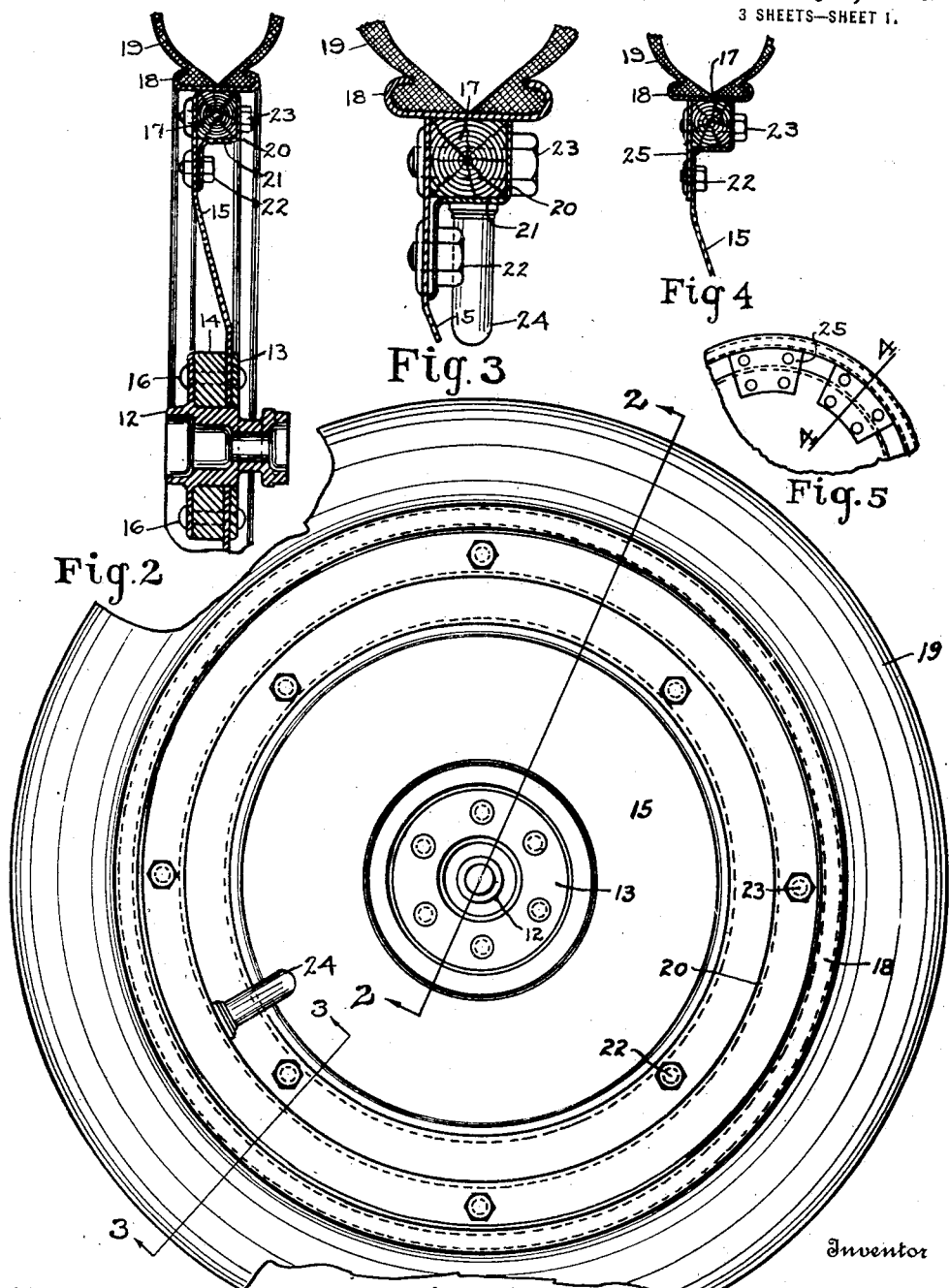

1,376,589.

Patented May 3, 1921.
3 SHEETS—SHEET 2.

Witness
Fred. W. Nover

Inventor
Alba. K. Simmons
By
B.W. Kadel.
Attorney

A. K. SIMMONS.
WHEEL.
APPLICATION FILED MAY 17, 1920.
1,376,589.
Patented May 3, 1921.
3 SHEETS—SHEET 3.
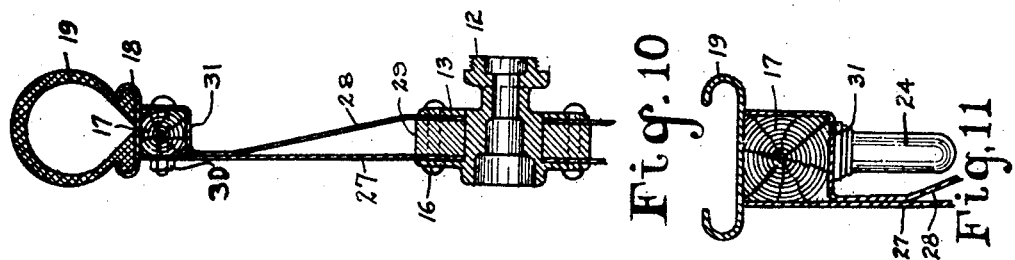
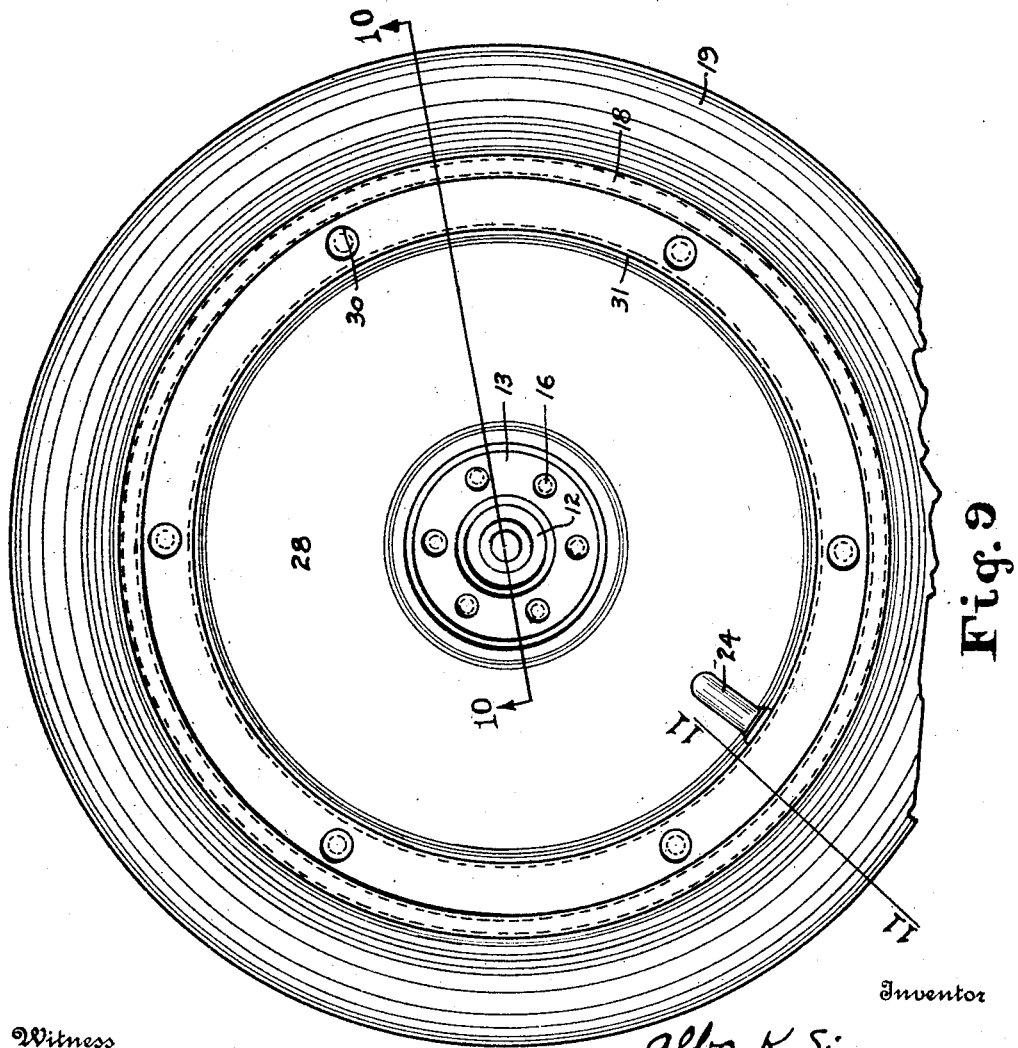

UNITED STATES PATENT OFFICE.

ALBA K. SIMMONS, OF ROANOKE, VIRGINIA.

WHEEL.

1,376,589.  Specification of Letters Patent.  Patented May 3, 1921.

Application filed May 17, 1920. Serial No. 381,834.

*To all whom it may concern:*

Be it known that I, ALBA K. SIMMONS, a citizen of the United States, residing at Roanoke, in the county of Roanoke and State of Virginia, have invented certain new and useful Improvements in Wheels, of which the following is a specification.

This invention relates to wheels for automobiles or other vehicles and has for its prime object to provide convenient and economical means for converting existing wood wheels into steel disk wheels. Another object is to provide a wheel wherein the tire is demountable with the felly. A still further object is to provide a steel disk wheel wherein the tire is well supported and where the pneumatic tube nipple will be exposed and be easy of access. Other objects will appear as the description of the invention proceeds.

The invention consists of the formation, combination and arrangement of parts as will be herein described and claimed.

Figure 6:
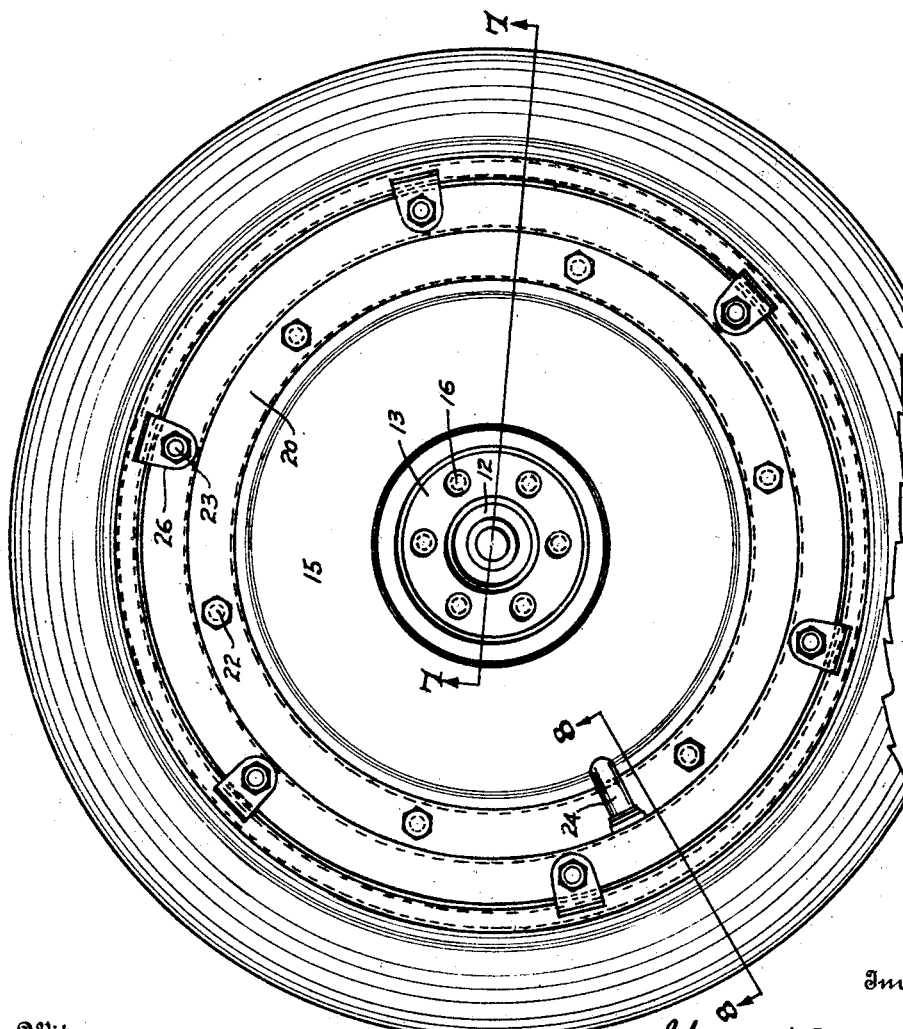

In the drawings, Figure 1 is a side elevational view of the preferred embodiment of the wheel of my invention, Fig. 2 a partial section taken on the radial line 2—2, of Fig. 1, and Fig. 3 an enlarged sectional view taken through the tire and felly on the line 3—3 of Fig. 1. Fig. 4 is a broken sectional view showing a slightly modified form of the felly-securing portion of the invention and Fig. 5 a partial side elevational view of this modified construction. Fig. 6 is a side elevational view of a further modification and Figs. 7 and 8 sectional views of the same, these views being taken on the correspondingly numbered section lines in Fig. 6. Fig. 9 is a side elevational view of a still further modification and Figs. 10 and 11 sectional views taken on the lines 10—10 and 11—11 respectively of Fig. 9.

Referring to these drawings, the wheel construction in the present embodiments is especially designed for converting existing wood wheels into steel disk wheels.

The central, metallic hub 12 is a portion of the regular wood wheel, as well as the spoke plate 13. The metallic washer or filler 14 is applied to the hub, back of the steel disk 15, the combined thickness of the filler and disk being sufficient to occupy the space formerly occupied by the inner or hub ends of the spokes. Rivets 16 are used to hold the parts 12 to 15 inclusive together at the hub. The disk 15 is attached near the outer face of this portion of the hub and as it extends from this position radially to the felly 17, it is directed inwardly so that the disk is formed with an outward dish as viewed from along side of the car. The felly 17 is the regular one used with the wood wheel, the spokes being sawed off or removed. The tire rim 18 is also salvaged, along with the felly, and remains firmly and securely attached to the felly. The tire 19 is applied with its beads beneath the edges of the rim in the usual manner.

The disk 15 thus extends to and overlies the inner face of the felly. Positioned against the outer face of the felly is a ring 20 which is offset at 21, at the inner periphery of the felly, so that its face lies against the face of the disk 15. Bolts 22 extend through the ring 20 and the disk, beneath the felly, and bolts 23 extend through the disk, the felly, and the ring 20. The shoulder or offset 21 in the ring forms a support for the felly. Upon removal of the bolts 22 and 23 the felly and tire-rim may be demounted from the disk 15. The disk 15 extending in dished fashion to the rear face of the felly not only provides lateral strength to the wheel, but also provides easy access to the tube nipple 24, which extends through the felly and the offset portion of the ring 20.

In the modification shown in Figs. 4 and 5 the disk 15, after being carried to the rear edge of the felly 17, is offset at the inner circumference of the felly to form a felly-support and is then extended around the front face of the felly. A series of plates 25 are secured to the disk and overlie the rear face of the felly, bolts 22 and 23 being used as before.

Figure 7:
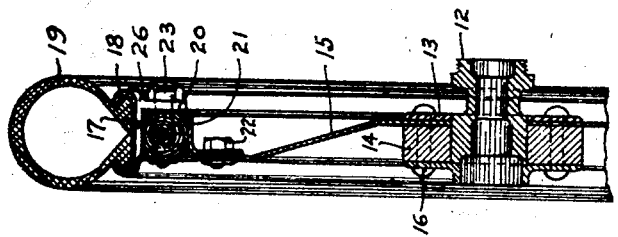
Figure 8:
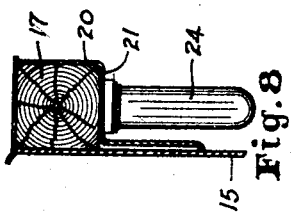

In the modification shown in Figs. 6, 7 and 8 the same elements are used as in the first described embodiment, but in addition the regular rim lugs 26 are used, the felly bolts 23 in this instance serving also to hold the rim lugs. In this instance the rim may be demounted independently of the felly. This construction may be used where it is desired to use, for example, a 30" x 3" tire on a 30" x 3½" felly.

In the embodiment shown in Figs. 9—10 and 11, two disks 27 and 28, are used per wheel, the filler 29 being interposed between them at the hub. The felly in this instance is positioned between the disks 27 and 28 and but one series of bolts 30 is used. One of the disks in this construction is offset at 31 at the inner edge of the felly to provide the proper support for it.

Having thus described my invention, what is claimed is:

1. A wheel for motor vehicles or the like including a centrally arranged hub, a felly, a disk attached to the hub and extending to one side of and overlying the felly, and a ring overlying the other side of the felly and extending centrally inside the limits thereof, there being securing means passing through the disk, the felly and the ring, and other securing means passing through the disk and the ring inside the limits of the felly.

2. A wheel for motor vehicles or the like, including a centrally arranged hub, a felly, a disk attached to the hub and extending radially therefrom to overlie the felly along one side thereof, a ring overlying the other side of the felly and extending inside the limits of the felly toward the hub, one of said felly-contacting members being offset at the inner periphery of the felly to contact the plane of the other member, the said offset being arranged to accommodate and support the felly, and there being securing means extending through the disk and the ring.

3. A wheel for motor vehicles or the like including a centrally arranged hub, a felly, a disk attached to the hub and extending radially therefrom to overlie the felly along one side thereof, felly-securing means overlying the other side of the felly and attached to the disk, one of the said felly-overlying members being offset to contact the plane of the other, and means for securing the felly and the overlying members together.

4. A wheel for motor vehicles or the like including a centrally arranged hub, a felly, a disk attached to the hub and extending radially therefrom to the outer circumference of the felly, the said disk originating at the hub at a plane near the outside thereof and extending inwardly to the rear face of the felly, a pneumatic tire positioned upon the felly with a nipple extending therefrom through the felly, the said nipple being disposed outside of the adjacent portion of the disk.

5. A wheel for motor vehicles or the like including a centrally arranged hub, a felly, a disk attached to the hub and extending radially therefrom to one side of and to overlie the felly, a shouldered felly-supporting ring overlying the other side of the felly and offset beneath the same to contact the adjacent face of the disk inside of the limits of the felly, means for securing the disk and the ring together, the felly being removable upon the removal of the ring.

6. A wheel for motor vehicles or the like including a hub, a felly, and a disk permanently secured to the hub and removably attached to the felly.

7. A wheel for motor vehicles or the like including a hub, a felly and a disk, the disk being secured to the hub and extending outwardly to one side of and to overlie the felly, and means for attaching the felly to the disk.

8. A wheel for motor vehicles or the like including a hub, a felly, and a disk, the disk being secured to the hub and extending outwardly to one side of and to overlie the felly, and means for demountably attaching the felly to the disk.

9. A wheel for motor vehicles or the like including a hub, a felly and a disk, the disk being secured to the hub and extending outwardly to the felly, and means carried by the disk for the support of the felly, said means including a felly-supporting shoulder member attached to the disk, the same being arranged in annular fashion around the edge of the disk and adjacent the inner periphery of the felly.

10. A wheel for motor vehicles or the like including a hub, a felly and a disk, the disk extending from the hub to overlie the one face of the felly, a second member overlying the other face of the felly, and securing means passing through the felly and through both overlying members, the felly being removable laterally from the disk upon the removal of the said securing means.

In testimony whereof I affix my signature.

ALBA K. SIMMONS.